J. E. BRUNDIN.
INLET AND DISTRIBUTING DEVICE FOR FULL MILK IN CREAM SEPARATORS.
APPLICATION FILED MAR. 2, 1918.
1,332,600.
Patented Mar. 2, 1920.
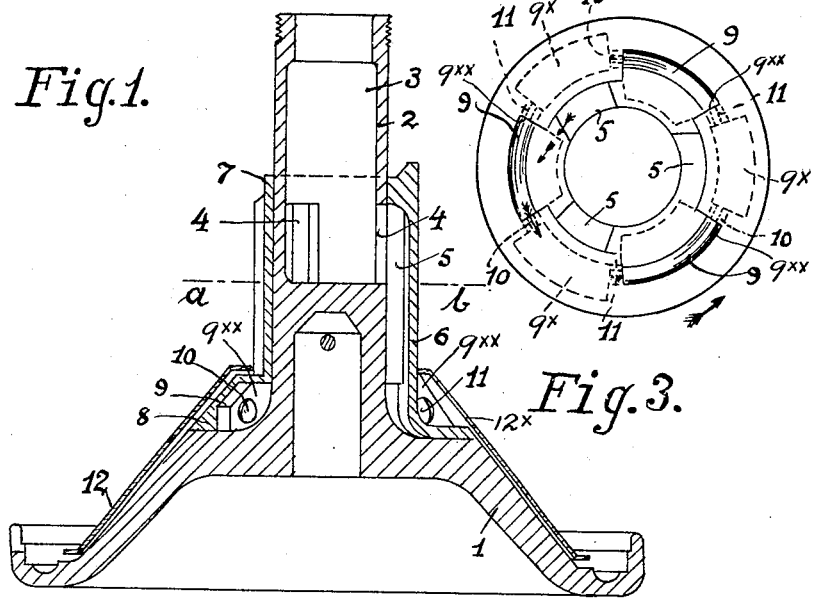
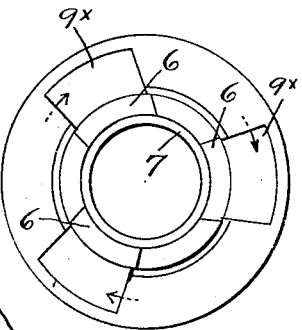
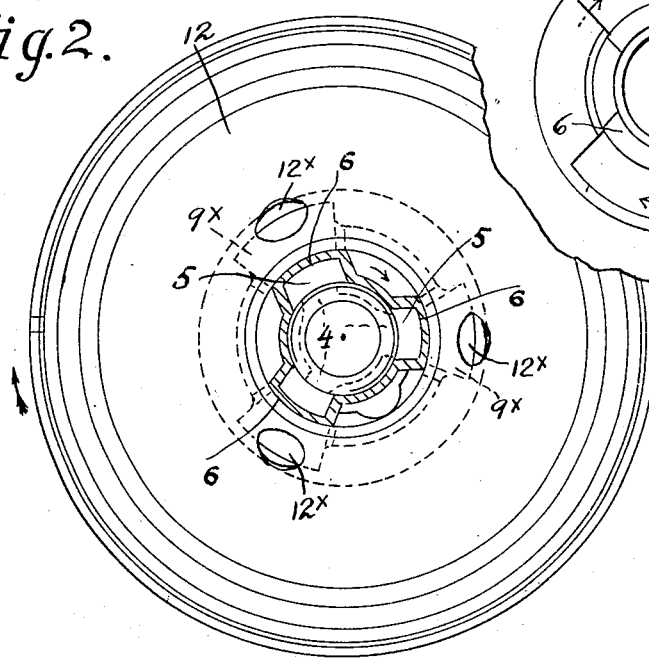
INVENTOR:
J. E. BRUNDIN
BY
ATTORNEY.

UNITED STATES PATENT OFFICE.

JOSEF ERIK BRUNDIN, OF STOCKHOLM, SWEDEN, ASSIGNOR TO AKTIEBOLAGET PUMP-SEPARATOR, OF STOCKHOLM, SWEDEN, A COMPANY REGISTERED UNDER THE LAWS OF SWEDEN.

INLET AND DISTRIBUTING DEVICE FOR FULL MILK IN CREAM-SEPARATORS.

1,332,600.      Specification of Letters Patent.    Patented Mar. 2, 1920.

Application filed March 2, 1918. Serial No. 220,026.

*To all whom it may concern:*

Be it known that I, JOSEF ERIK BRUNDIN, a subject of the King of Sweden, and resident of Drottningholmsvägen 6, Stockholm, in the Kingdom of Sweden, have invented certain new and useful Improvements in Inlet and Distributing Devices for Full Milk in Cream-Separators, of which the following is a specification, reference being had therein to the accompanying drawing.

This invention relates to inlet- and distributing devices for the full milk in cream-separators of that type, in which channels are provided extending longitudinally of the ordinary central inlet pipe to the lower part of the centrifugal drum, which channels communicate with the said pipe and conduct the full milk, let into the same, to the lower part of the inset of the drum for the distributing of the same in the said inset. The said channels generally are effected by a distributing pipe slid on the central pipe. In inlet- and distributing devices of the said type hitherto used the milk passes from the channels respectively through a radial opening. Experience has shown, that the said opening is stopped up by hairs and dirt in the milk after a short running of the separator, due to the fact that there is no possibility for the hairs, etc., of accumulating in the inlet pipe before reaching the outlet opening. The object of this invention is to remove the said disadvantage which is gained by providing in the distributing pipe, at the lower end of the channels respectively, a chamber, in which the dirt may accumulate and which has an outlet opening located peripherally to the pipe. For additional security the said chamber may be provided with two peripheral outlet openings, located at opposite sides of the same.

Figure 1 of the accompanying drawing is a vertical cross section of the bottom wall of the centrifugal drum with the central pipe and a distributing pipe slid on the latter and arranged in accordance with this invention. Fig. 2 is a section on the line *a* to *b* of Fig. 1. Fig. 3 shows the distributing pipe viewed from below, and Fig. 4 is a top view of the said distributing pipe.

From the bottom wall 1 of the drum the ordinary central pipe 2 extends, which is provided with an inlet channel 3 for the full milk, closed at its bottom. At the bottom of the said channel 3 openings 4 are provided in the wall of the pipe, which communicate with distributing channels 5, inclosed by the pipe 2 and outwardly curved parts 6 of the distributing pipe 7 slid on the central pipe. According to this invention chambers 9 are provided in the foot piece 8 of the distributing pipe 7, which are located at the side of the lower ends of the channels 5 and communicate with the channels, the said chambers, 9, being separated from chambers $9^x$ by substantially radial side walls $9^{xx}$. In the fore side wall $9^{xx}$ of the chambers 9 respectively with relation to the rotary direction of the drum (indicated by the arrows in Figs. 2 and 3) an outlet opening 10 is provided.

The full milk let into the channel 3 passes through the openings 4, the channels 5 and then into the chambers 9. During the rotary motion of the drum the milk passes in the direction indicated by the arrows, Fig. 3 *i. e.* from the channels 5 respectively into the corresponding chamber 9 and then through the opening 10 into the chamber $9^x$ located between a bottom wall of the distributing pipe and the lowermost disk 12 of the inset, the milk being then distributed between the other disks in the usual manner through openings $12^x$ provided in the disks. During the passage of the milk through the chambers 9 the velocity of the same is increased, owing to the fact that the milk must leave the chambers 9 in the direction in which the drum is rotated, Fig. 3. Owing to the fact that the lighter milk-particles are able to assume the greater velocity more easily than the heavier dirt, the latter will stay behind in the chambers and is forced by the centrifugal force outward to the outer wall of the chambers respectively, on which, consequently, the dirt accumulates. Consequently, the openings 10 are stopped up not at all or only after long running of the separator. A peripheral outlet opening 11 may be provided also in the rear side wall of the chambers with relation to the rotary direction of the drum, the passage of the milk through the inlet- and distributing pipe without interruption being thereby still more insured. Also when two outlet openings are provided there is a chance for the dirt, etc., to accumulate in the chambers 9.

Experiments made have proved that separators provided with inlet- and distributing pipes arranged in accordance with this invention may be run for a long time without the said pipe being stopped up. The invention may evidently be modified in many respects without exceeding the limits of the same, and may be applied also to separators for other liquids than milk.

Having now described my invention, what I claim as new and desire to secure by Letters Patent is:

1. In an inlet and distributing device for the full milk in cream separators, the combination with a central inlet pipe for the milk and channels extending longitudinally of said pipe and communicating therewith, of chambers at the side of the lower ends of said channels and communicating therewith, and forward and rearward walls for separating said chambers from each other, each of said forward walls having a peripheral outlet opening.

2. In an inlet and distributing device for the full milk in cream separators, the combination with a central inlet pipe for the milk and channels extending longitudinally of said pipe and communicating therewith, of chambers at the side of the lower ends of said channels and communicating therewith, and forward and rearward walls for separating said chambers from each other, each of said forward and rear walls having a peripheral outlet opening therein.

In witness whereof I have hereunto signed my name.

JOSEF ERIK BRUNDIN.